UNITED STATES PATENT OFFICE

HARRISON PORTER HOOD, OF CORNING, NEW YORK, ASSIGNOR TO CORNING GLASS WORKS, OF CORNING, NEW YORK, A CORPORATION OF NEW YORK

ULTRA-VIOLET TRANSMITTING SUBSTANCE

No Drawing. Application filed September 21, 1928, Serial No. 307,395, and in France June 4, 1926.

I have discovered that contrary to accepted views, good ultra-violet transmission in glasses is not due to or in consequence of special glass ingredients, but is due to the absence from glass of exceedingly minute quantities of ferric oxide and titanium oxide, and that to obtain transmission in the ultra-violet and particularly that part thereof which is believed to have the most beneficial effect in the treatment of certain diseases, it is necessary to diminish by very special technique the ferric oxide and titanium contents of the glass. To accomplish this the total iron content of the glass should be kept as low as possible by the purification of the batch ingredients and by proper selection of the melting containers, and that the remaining iron should be reduced to a ferrous condition by melting the batch under reducing conditions.

The present application has for its purpose to set forth and to secure protection upon certain matters by which glasses having high ultra-violet transmission may be obtained, their fabrication facilitated, and their permanence increased.

Certain of the inventions set forth herein have been disclosed in a series of applications heretofore filed by me as follows, to-wit,—Serial No. 35,489, filed June 6, 1925; Serial No. 62,468, filed Oct. 14, 1925; Serial No. 130,771, filed August 21, 1926; Serial No. 226,515, filed Oct. 15, 1927; and Serial No. 262,029, filed March 15, 1928.

Claims on matters common to the several applications and to this application are made herein while the claims of the earlier applications have been restricted to matters not claimed herein.

It has been found that ultra-violet transmitting glasses containing reduced iron on prolonged exposure to ultra-violet rays have their transmission reduced. I have discovered that the presence of boric oxide in both oxidized and reduced glasses reduces their loss in transmission when exposed to the shorter ultra-violet rays.

As indicating the necessity of diminishing as much as possible the iron content of ultra-violet transmitting glasses it is noted that it is advantageous in the manufacture thereof to use as silica ground vein quartz as distinguished from quartzes which are known as secondary quartzes.

While as previously stated ultra-violet transmission cannot be ascribed as a special property of any glass making oxid, and while good ultra-violet transmission is a property of all glasses provided certain metallic oxids such as ferric iron, titanium oxide and lead oxide, and perhaps some few others, are absent from the glass, nevertheless glasses of certain types have advantages for certain purposes. The following table is given as illustrating the widely different types of glasses which may be used in carrying out my invention.

|  | A | B | C | D | E | F |
|---|---|---|---|---|---|---|
| $SiO_2$ | 78 | 74 | 81 | 80 | 72 | 0 |
| $B_2O_3$ | 0 | 10 | 8 | 10 | 5 | 5 |
| $Na_2O$ | 8 | 5 | 9 | 4 | 13 |  |
| $K_2O$ | 9 | 6 | 0 | 2 | 0 |  |
| $CaO$ | 0 | 0 | 0 | 0 | 6 | 26.8 |
| $ZnO$ | 4 | 4 | 0 | 3 | 3 |  |
| $Al_2O_3$ | 1 | 1 | 2 | 1 | 1 |  |
| $P_2O_5$ |  |  |  |  |  | 68.2 |

My investigations of glasses of the types above indicated resulted in the discovery of certain interesting and valuable features.

Those of the above glasses containing silica when melted under reducing conditions, if they contain even minute traces of iron, when exposed to sunlight for a prolonged period or to a mercury arc lamp for a shorter period, tend to deteriorate in their ultra-violet transmission, for a time, after which the transmission remains nearly constant. Inasmuch as the treatment under the mercury arc lamp is more severe as a test than sunlight and identical radiation conditions can be duplicated, exposure to the mercury arc lamp affords a convenient means of measuring the deterioration of such glasses. I have investigated this by the method described in the Journal of the Optical Society of America, vol. 7, #6, 1923, page 439, except that a photo-electric cell and a valve amplifier were substituted for the vacuum thermopile. This method uses a quartz mercury arc as a light source, a quartz monochrometer, a photo-electric cell, a valve amplifier, and a galvanometer. The photo-electric cell was arranged to receive the various mercury lines as desired. A series of five or ten galvanometer deflections for a line of the given wave lengths was obtained with no glass in the light path, and then a similar set of readings was taken with the glasses to be measured placed between the light source and the slit of the monochrometer. The average of the latter readings divided by the average of the former gave the transmission of the glass for the particular line in question, and these measurements are believed to be accurate within a limit of error of about 2%.

In the following "permanent transmission" is the transmission at 302 millimicrons with a thickness of 2 mm. uncorrected for surface reflection after exposure to ultra-violet radiation equivalent to that of a new quartz mercury arc lamp for a period of forty-two (42) hours. This exposure was made at a distance of six (6) inches from a mercury arc operating on seventy-five (75) to eighty (80) volts and consuming four and one half (4½) to five (5) amperes. "A new quartz mercury arc lamp" is used as a standard of comparison because it is known that the quartz envelope of such lamps also loses a portion of its ultra-violet transmitting characteristics upon long-continued exposure to the ultra-violet radiation.

This permanent transmission should of course be contrasted with transmission of the newly made glasses which may be termed "initial transmission".

My investigation shows that the addition of boric oxide to an oxidized glass reduces the initial transmission of such glass for a given percentage of ferric oxide and of titanium. In the reduced glasses, however, boric oxide apparently aids the more complete reduction of the iron contained therein and is therefore an advantage. The additions of boric oxide amounting to from five to fifteen percent of the glass ingredients tends to prevent deterioration of glasses on exposure to the shorter ultra-violet rays, so that the permanent transmission of such a borate glass may be higher than the permanent transmission of a non-borate glass, although the amount of impurities in the two is the same. On the other hand the initial transmission of such a borate glass may be less than the initial transmission of the non-borate glass. Thus a certain glass not containing boric oxide has an initial transmission of 77%. The addition of 5%, 10% and 15%, respectively, of boric oxide to such glass cuts down the initial transmission to 75%, 75% and 69% respectively. The permanent transmission of these four glasses, namely, the glass without boric oxide and with 5%, 10% and 15% boric oxide, was 62%, 63%, 64% and 65%. Thus the presence of 15% boric oxide changed a loss due to deterioration from 15% to 4% and caused the 15% glass to have a higher permanent transmission than the non-borate glass. As a general rule less than 5% or more than 15% of boric oxide is not useful for the purposes stated. I have further found that deterioration such as above referred to is not present in borate glasses not containing silica, but that the addition of silica thereto causes deterioration, and that boric oxide has a greater tendency to restrict fading in straight alkali glasses than in alkali lime glasses. On the other hand boric oxide in reduced glasses aids initial transmission.

Several series of reduced melts made according to my disclosure have shown that for a constant but low iron content increased transmissions are obtained with batches of increasing acid ratios. This ratio is obtained by dividing the sum of the percentages of acidic constitutents, including therein silica and boric oxide, but not alumina, by the sum of the percentage values of the first group alkali oxide constituents. The increase of silica has a more marked effect than boric oxide in raising the transparency of resulting glasses, and therefore for the first the percentage of silica should be at least five times the percentage of boric oxide. There is very little difference between potash and soda in their effect in this ratio, the former gives slightly better transmission values. Lithia gives poor transmission values.

The second group oxides have little of the effect of the first group alkalies, and zinc oxide gives a little better transmission value than lime. Their effect however is very much smaller than the effect caused by variations in first group alkali.

I have found glasses having an acid ratio above eight yield higher transmissions for a given low impurities content. Glasses having an acid ratio as high as twenty-two have been made by me, but glasses in this neighborhood and above are very hard and difficult to melt, especially when the silica content is high, but the increased transmission justifies the use of ratios from 8 to 15. (See Glasses C and D.)

My investigations show that in the abscence of lead and other absorbing materials ultra-violet transmission can be obtained by diminishing almost to the vanishing point the ferric iron and titanium contents of the glass. In investigating these transmissions with various percentages of impurities I have found it preferable in conducting my experiments, owing to the difficulty of making accurate analytical determinations of minute amounts of ferric and ferrous iron in glasses, to start with the purest material available, ascertain the amount of iron and titanium to the batches of this material which are to constitute the various melts, and then melt in fused silica crucibles.

Following this plan I made a series of melts of plain silicate, borosilicate and phosphate glasses by varying the base composition as little as possible, compatible with adding different amounts of boric acid, indicated by the following:

|  | V | VI | VII | VIII | IX |
|---|---|---|---|---|---|
|  | Per cent | Per cent | Per cent | Per cent | Per cent |
| $SiO_2$ | 75 | 75 | 70 | 65 | 0 |
| $B_2O_3$ | 0 | 5 | 10 | 15 | 0 |
| $Na_2O$ | 15 | 10 | 10 | 10 | 0 |
| $ZnO$ | 5 | 5 | 5 | 5 | 0 |
| $CaO$ | 4 | 4 | 4 | 4 | 28 |
| $P_2O_5$ | 0 | 0 | 0 | 0 | 72 |
| $Al_2O_3$ | 1 | 1 | 1 | 1 | 0 |

Measurements made by the method above indicated on various glasses of the types contained in the last table give when the transmission values were plotted against the ferric oxide and titanium oxide contents of the various glasses the following indication of initial transmissions obtainable in the various glasses with various percentages of ferric oxide and titanium.

*Initial transmissions at 302 millimicrons in 2 mm. thicknesses*

| % of U.V. Tr. | Silicates— No $B_2O_3$ | | Borosilicates | | | | | | Phosphates | |
|---|---|---|---|---|---|---|---|---|---|---|
| | | | $B_2O_3$ 5% | | $B_2O_3$ 10% | | $B_2O_3$ 15% | | | |
| | $Fe_2O_3$ | $TiO_2$ | $Fe_2O_3$ | $TiO_2$ | $Fe_2O_3$ | $TiO_2$ | $Fe_2O_3$ | $TiO_2$ | $Fe_2O_3$ | $TiO_2$ |
| 30 | 0.0296 | 0.025 | 0.0272 | 0.025 | 0.0239 | 0.025 | 0.0216 | 0.025 | 0.0019 | 0.025 |
| 50 | 0.0161 | 0.025 | 0.0139 | 0.025 | 0.0119 | 0.025 | 0.0106 | 0.025 | 0.0003 | 0.025 |
| 80 | 0.0019 | 0.025 | 0.0025 | 0.008 | 0.0022 | 0.008 | 0.0018 | 0.008 | 0.0004 | 0.002 |

*Initial transmissions at 280 millimicrons in 2 mm. thicknesses*

| % of U.V. Tr. | Silicates— No $B_2O_3$ | | Borosilicates | | | | | | Phosphates | |
|---|---|---|---|---|---|---|---|---|---|---|
| | | | $B_2O_3$ 5% | | $B_2O_3$ 10% | | $B_2O_3$ 15% | | | |
| | $Fe_2O_3$ | $TiO_2$ | $Fe_2O_3$ | $TiO_2$ | $Fe_2O_3$ | $TiO_2$ | $Fe_2O_3$ | $TiO_2$ | $Fe_2O_3$ | $TiO_2$ |
| 20 | 0.0104 | 0.025 | 0.0093 | 0.025 | 0.0079 | 0.025 | 0.0076 | 0.025 | 0.0017 | 0.012 |
| 30 | 0.0070 | 0.025 | 0.0062 | 0.025 | 0.0048 | 0.025 | 0.0046 | 0.025 | 0.0006 | 0.012 |
| 50 | 0.0026 | 0.025 | 0.0016 | 0.025 | 0.0009 | 0.025 | 0.0009 | 0.025 | 0.0004 | 0.006 |
| 80 | 0.0002 | 0.006 | 0.0022 | 0.006 | 0.0001 | 0.006 | 0.0004 | 0.002 | 0.0000 | 0.0015 |

The regions of 302 and 280 millimicrons were selected as the standards of measurement due to the occurrence at these points of mercury lines, and hence their convenience as mile stones.

The above measurements were made as accurately as possible and are believed to be correct within a limit of error of 5%, that is, for a given ferric oxide and titanium content, the percentages of transmission are correct within 5%. For example, in a borosilicate glass containing 5% boric oxide and having a ferric oxide content of 0.0272 of one per cent and a titanium content of 0.025 of one per cent, the transmission is given above as being 30% at 302 millimicrons, in 2 mm. thicknesses, but the percentage transmission for these impurity contents might be as high as 35% or as low as 25%.

My investigations show that transmission of 70% at 302 millimicrons in 2 mm. thicknesses can be obtained by keeping the ferric oxide impurities in the resulting glass as low as 0.006 of one per cent and the titanium impurities in the resulting glass as low as 0.025 of one per cent, in silicate glasses which do not contain boric oxide, and by tolerating slightly less of each of these impurities, as the boric oxide content is increased. Glasses made of batch materials having low enough impurity contents so that the resulting glasses do not exceed these impurity limits, if containing boric oxide in amounts up to 15%, are within the scope of the present application and result in glasses whose permanent ultra-violet transmission, uncorrected for surface reflection, is greater than 30% at 302 millimicrons in 2 mm. thicknesses. If the resulting glass contains boric oxide and not exceeding 0.010 of one per cent of total iron, a permanent ultra-violet transmission of 40% at 302 millimicrons in 2 mm. thicknesses is obtainable. If the titanium is kept below 0.010 of one per cent, and if the total iron is increased to 0.03 of one per cent, and substantially all of it is kept in the ferrous condition, by melting under reducing conditions, it is possible to obtain a permanent ultra-violet transmission of 60% at 302 millimicrons in 2 mm. thicknesses. If the resulting glass contains less than 0.005 of one per cent of total iron and less than 0.008 of one per cent of titanium, however, a permanent ultra-violet transmission of over 60% at 302 millimicrons in 2 mm. thicknesses is obtained. If the resulting glass contains less than 0.003 of one per cent of total iron and less than 0.006 of one per cent of titanium, a permanent ultra-violet transmission of over 65% at 302 millimicrons in 2 mm. thicknesses is obtained.

The manufacture of ultra-violet transmission of glasses such as here discussed requires extreme precautions to insure the purity of the materials and the purity of the ultimate glass if satisfactory transmission is to be obtained, precautions much greater than are commonly employed in the manufacture of commercial glasses, or even ordinary laboratory essays or melts.

By preference the silica is obtained from vein quartz which is crushed to pass a 40 mesh sieve and then washed with hydrochloric acid to remove any iron introduced during the crushing, or phosgene may be used to remove the iron.

The other materials used in the above glasses were also low in objectionable impurities, either as obtained or as a result of special purification. To illustrate the importance of this special purification of otherwise standard and accepted glass making chemicals, it is noted that the zinc oxide generally used by glass makers should, in order to obtain the high transmission here considered, be given a special purification to remove the small percentage of lead found therein which in a glass to whose batch as little as 5% of zinc oxide is added, might amount to 0.02%, and which would deleteriously affect the transmission of the resultant glass.

In order to secure the highest transmission of ultra-violet in my glasses, the zinc oxide used in their production is subjected to a purification treatment by which the lead oxide content of the resulting glass is decreased to 0.003% or less. The boric oxide used in the batches are preferably added in the form of boric acid, although it can be added as borax.

The receptacle in which the melt is made is another important factor. Ordinary clay crucibles are objectionable because enough titanium and iron oxides are introduced to cause absorption, especially if the batch materials contain appreciable amounts of these impurities. Chemical reduction of titanium oxide during melting is fairly difficult and of very little use. Graphite containers cannot be used for anything but very small melts due to excessive reduction. The best results have been obtained in fused quartz crucibles, but good results are obtained by melting in tanks constructed of good quality silica bricks, or other specially prepared refractories low in titanium and ferric oxide.

It will be obvious that if the iron contents indicated herein are increased, within reasonable limits, and the titanium contents are correspondingly decreased, and vice versa, the same transmission will still be obtained. Hence it will be understood that, in my specification and claims, where I have stated both the allowable iron and titanium contents for a single glass, the stated iron and titanium contents are the equivalent of the resulting iron and titanium contents when one of these impurities has been increased and the other has been correspondingly decreased.

Inasmuch as it is the ultimate ferric oxide and titanium contents of the glass which control the limit of its transmission, the batch can often be melted under either reducing conditions or oxidizing conditions, the particular conditions chosen in any particular case being dependent upon the percentage of transmission desired and the impurity content of the raw materials, as well as the character of the refractory in which the melting takes place. It should be understood, however, that where the iron content of the raw materials or of the refractory is relatively high, it is usually better to melt under reducing conditions as this keeps nearly all of the iron in the ferrous state and thereby greatly improves the transmission, whereas if this same glass is melted under oxidizing conditions practically all of the iron will remain in the ferric state and the percentage of transmission will be materially lowered. However, where the highest possible transmission is not desired, less attention need be paid to any one of the factors entering into this invention. The best results are obtained by a combination of exceptionally low iron and titanium impurities in the raw materials and in the refractories in which these raw materials are melted, and also the use of a refractory having a minimum degree of solubility in the glass, coupled with melting under reducing conditions.

When the glass is to be melted under reducing conditions the addition of carbonaceous material to the batch is desirable. However, carbon compounds tend to give an amber color to the glass and to cut down the visible transmission. Furthermore, the yellow shade imparted by their use cuts down the transmission at the blue and ultra-violet end of the spectrum. By adding zinc to the batch, as is the case in glasses A, B, D and E this amber color is prevented and a colorless or slight blue green is obtained which has a better transmission even when there are carbonaceous materials in excess of the quantity usable as a reducing agent for the iron. This permits the use of sufficient carbonaceous material to insure the reduction of the maximum percentage of the iron content without causing discoloration.

As an indication of the extreme care required in melting these high transmission glasses, it is noted that it is desirable to use air and fuel gas which have been filtered and to provide the heated burner with nickel tips to prevent introduction of iron scale from the same.

Excessive exposure of the molten reduced glass to air is to be avoided due to the resultant reoxidization of the ferrous iron. The time required by the usual processes of working into sheet formation is not, however, objectionable.

By "glass" I means products of this type containing at least three elements in substantial proportions, and excluding what is known as "fused quartz".

By "ferric oxide" I mean actual ferric oxide, whereas "iron" or "total iron" cover total iron calculated as ferric oxide, which is the usual method of reporting the iron content.

By "ferrous oxide" I mean actual ferrous oxide.

By "titanium" I mean all the titanium present calculated as titanium dioxide.

By "under reducing conditions", I mean melting a batch containing materials which are designed to assure substantially all of the iron being in the ferrous state, or melting a batch under conditions which will produce a similar result.

By "under oxidizing conditions" I mean melting a batch containing materials which are designed to assure substantially all of the iron being in the ferric state, or melting a batch under conditions which will produce a similar result.

By "permanent high ultra-violet transmission", as used herein, I means glasses whose ultra-violet transmission at 302 millimicrons, in thicknesses of 2 mm., uncorrected for surface reflection, does not fall below 30%.

I declare that what I claim is:

1. The method of making a glass containing substantial quantities of zinc and transparent to the ultra-violet which comprises so decreasing the iron and lead contents in the glass ingredients and so melting the mixed ingredients that the resultant glass contains less than 0.03% of ferric oxide and less than 0.02% of lead oxide.

2. The method of making a boro-silicate glass which will transmit at least 30% of the ultra-violet in the region of 302 millimicrons when made in 2 millimeter thicknesses which comprises adding to the batch ingredients a boron compound in such quantities that, in the resultant glass the sum of the percentages of the silica and boric oxide is ten to twenty-two times the sum of the percentages of alkalis.

3. The method of making a glass which in a thickness of 2 mm. transmits at least 30% of light at 302 millimicrons, which consists in so decreasing the iron and titanium contents of the batch ingredients and so melting the batch that the resultant glass contains less than 0.03 ferric oxide and less than .025 titanium oxide.

4. The method of making a glass transparent to the ultra-violet which consists in melting a suitable batch purified of iron and titanium contents in a tank lined with silica brick.

5. The method of making a glass transparent to ultra-violet which consists in so decreasing the iron and titanium contents in the ingredients of the batch therefor, the batch including zinc and carbonaceous materials in excess of the proportions necessary for the reduction of the iron and so melting the batch under reducing conditions that the resultant glass contains less than 0.03 of ferric oxide.

6. A glass transparent to the ultra-violet which contains a substantial quantity of zinc and less than 0.02% lead oxide.

7. A glass transparent to the ultra-violet which contains a substantial quantity of zinc, less than 0.03 ferric oxide, less than 0.025% titanium oxide and less than 0.02% lead oxide.

8. A glass which will transmit at least 30% of the ultra-violet in the region of 302 millimicrons when made in 2 mm. thicknesses, containing silica, boric oxide and alkali, in which the sum of the percentages of the silica and boric oxide is from ten to twenty-two times the sum of the percentage of the alkali.

9. A glass which will transmit at least 30% of the ultra-violet in the region of 302 millimicrons when made in 2 mm. thicknesses, containing silica, boric oxide and alkali, in which the sum of the percentages of the silica and boric oxide is from eight to twenty-two times the sum of the percentage of the alkalies, and the percentage of silica is at least five times the percentage of boric oxide.

10. A glass which in a thickness of 2 mm. transmits at least 30% of light at 302 millimicrons containing less than 0.03 ferric oxide and less than 0.025 titanium oxide.

11. A glass which in a thickness of 2 mm. transmits at least 50% of light at 302 millimicrons containing less than 0.016% ferric oxide and less than 0.025% tantanium oxide.

12. A glass which in a thickness of 2 mm. transmits at least 70% of light at 302 millimicrons containing less than 0.006% of ferric oxide and less than 0.025% titanium oxide.

13. A glass having in a thickness of 2 mm. a permanent transmission of over 60% of light at 302 millimicrons, containing boric oxide and less than 0.03 of total iron most of which is in a reduced condition, and less than 0.01 of titanium oxide.

14. A batch containing zinc oxide and a reducing carbonaceous material for producing a glass having high ultra-violet transmission.

15. The method of making glasses having permanent high ultra-violet transmission, which consists in decreasing the iron contents of batch materials, which are otherwise suitable for the production of ultra-violet transmitting glasses, including a boric oxide containing material, to less than 0.010 of one per cent, and melting these batch materials.

16. The method of making glasses having permanent high ultra-violet transmission, which consists in decreasing the iron and titanium contents of batch materials, which are otherwise suitable for the production of ultra-violet transmitting glasses, including a boric oxide containing material, to 0.005 of one per cent and 0.008 of one per cent, respectively, and melting these batch materials.

17. The method of making glasses having permanent high ultra-violet transmission, which consists in decreasing the iron and titanium contents of batch materials, which are otherwise suitable for the production of ultra-violet transmitting glasses, including a boric oxide containing material, to 0.003 of one per cent and 0.006 of one per cent, respectively, and melting these batch materials.

18. The method of making glasses having permanent high ultra-violet transmission, which consists in mixing vein quartz, that is relatively free of iron and titanium, with otherwise suitable batch materials, including a boric oxide containing material, all of which are relatively free of iron and titanium, and melting these batch materials.

19. The method of making glasses having permanent high ultra-violet transmission, which consists in treating vein quartz to remove substantially all the iron and titanium contained therein, mixing this with otherwise suitable batch materials, including a boric oxide containing material, which have also been treated to remove substantially all the impurities, and melting these batch materials.

20. The method of making glasses having permanent high ultra-violet transmission, which consists in treating vein quartz with acid to decrease substantially the iron contained therein, mixing this with otherwise suitable batch materials, including a boric oxide containing material, which have also been treated to remove substantially all the impurities, and melting these batch materials.

21. The method of making glasses having permanent high ultra-violet transmission, which consists in treating vein quartz with hydrochloric acid to decrease substantially the iron contained therein, mixing this with otherwise suitable batch materials, including a boric oxide containing material, which have also been treated to remove substantially all the impurities and melting these batch materials.

22. A process of making ultra-violet ray transmitting glass which consists in providing a selected batch, said batch containing silica and alkaline earth material and being low in impurities of iron and titanium, and melting such batch into glass without introducing into the glass during the melting operation an amount of iron or titanium to materially affect the transmission of the resulting glass.

23. The method of making glasses having permanent high ultra-violet transmission, which consists in mixing a batch containing silica, a boric oxide containing material, soda, zinc oxide, and lime, which have been treated to decrease the iron contents, and melting the batch.

24. The method of making glasses having permanent high ultra-violet transmission, which consists in mixing a batch containing silica, a boric oxide containing material, soda, zinc oxide, and lime, all of which materials are low in iron and titanium at the time heat is applied to the batch, and melting the batch.

25. The method of making glasses having permanent high ultra-violet transmission, which consists in mixing a batch containing silica, a boric oxide containing material, soda, zinc oxide, and lime, which have been treated to decrease the iron and titanium contents, and melting the batch.

26. A process of making ultra-violet transmitting glass which consists in providing a predetermined batch of suitable materials, said batch being low in impurities of iron and titanium and melting such batch under a reducing condition without introducing into the glass during the melting an amount of iron or titanium sufficient to materially affect the ultra-violet ray transmission of the resulting glass.

27. The process of making ultra-violet ray transmitting glass which consists in providing a selected batch of materials which are low in impurities of iron and titanium, and melting such batch under a reducing condition in a container which will not materially affect the transmission of the resulting glass.

28. The process of making ultra-violet transmitting glass which consists in providing a batch of material which are low in impurities of iron and titanium, and melting such batch under a reducing condition, in a type of container which is low in impurities of iron and titanium.

29. The process of producing a glass having high ultra-violet transmission, which consists in mixing a batch of ferruginous materials having an iron content of less than 0.040 of one per cent figured as ferric oxide, and melting the batch under reducing conditions.

30. The method of producing an ultra-violet transmitting silicate glass which, in thicknesses of 2 mm., transmits 60% of light waves at 302 millimicrones, and which comprises melting proper batch material and subjecting it to a suitable reducing agent to produce such a glass.

31. The process of producing a glass which, in thicknesses of 2 mm., transmits 30% of light waves at 302 millimicrons, which consists in decreasing the quantity of titanium and iron impurities present in the raw material and melting, the material being subjected to reducing conditions prior to its final setting.

32. The process of producing a glass which, in thicknesses of 2 mm., transmits 60% of light waves at 302 millimicrons, which consists in decreasing the quantity of iron impurities present in the raw material, and melting the raw material under non-oxidizing conditions.

33. The method of producing an ultra-violet transmitting boro-silicate glass which, in thicknesses of 2 mm., transmits 30% of light waves of 302 millimicrons, and which comprises melting proper batch material and subjecting it to a suitable reducing agent to produce such a glass.

34. The process of making ultra-violet ray transmitting glass which consists in providing a selected batch of materials as regards impurities of iron and titanium, said batch containing silica and an alkaline earth, and melting such batch under a reducing condition in a container which will not materially affect the transmission of the resulting glass.

35. The process of producing a glass having a high ultra-violet transmission which consists in mixing a batch containing silica, zinc and iron, the latter amounting to less than 0.04 of one per cent figured as ferric oxide and melting the batch under reducing conditions.

36. A glass having permanent high ultra-violet transmission and containing less than 0.010 of one per cent of total iron.

37. A glass having high ultra-violet transmission, and containing less than 0.04 of one per cent of total iron figured as ferric oxide.

38. A glass having high ultra-violet transmission, and made of normally ferruginous material, and containing less than 0.04 of one per cent of total iron figured as ferric oxide.

39. A glass having high ultra-violet transmission, and containing less than 0.004 of one per cent of ferric oxide.

40. A glass having high ultra-violet transmission, and made of normally ferruginous material, and containing less than 0.004 of one per cent of ferric oxide.

41. A glass having high ultra-violet transmission, and containing less than 0.025 of one per cent of titanium.

42. A glass having high ultra-violet transmission, and made of normally titaniferous material, and containing less than 0.025 of one per cent of titanium.

43. A glass having permanent high ultra-violet transmission and containing less than 0.005 of one per cent of total iron and less than 0.008 of one per cent of titanium.

44. A glass having permanent high ultra-violet transmission and containing less than 0.003 of one per cent of total iron and less than 0.006 of one per cent of titanium.

45. A glass which, in thicknesses of 2 mm., transmits 50% of light waves as short as 280 millimicrons, and contain at least three elements in substantial proportions, its titanium oxide content being less than .004 of one per cent.

46. A glass having high ultra-violet transmission, and made of normally titaniferous and ferruginous material, and containing less than 0.025 of one per cent of titanium and less than 0.016 of one per cent of ferric oxide.

47. An ultra-violet transmitting glass made of normally ferruginous material, and containing not over 0.016 of one per cent of ferric oxide, and which, in thicknesses of 2 mm., transmits 50% the radiation of 302 millimicrons length.

48. A silicate glass containing at least three elements in substantial proportions, and being characterized by the fact that it is sufficiently free from impurities of iron and titanium so that it is transparent to light waves as short as 250 millimicrons, when in a thickness of 2 mm.

49. A silicate glass which in a thickness of 2 mm., is transparent to light waves as short as 250 millimicrons, and containing at least three elements in substantial proportions and being characterized by having a low content of impurities of iron and titanium which are in a reduced condition.

50. A non-borate silicate glass containing less than 0.016 of one per cent of ferric oxide, and which, in thicknesses of 2 mm., transmits over 50% of the radiation of 302 millimicrons length.

51. A non-borate silicate glass containing less than 0.020 of one per cent of ferric oxide, and which, in thicknesses of 2 mm., transmits over 30% of the radiation of 302 millimicrons length.

52. A glass which, in thicknesses of 4 mm., is transparent to light waves shorter than 300 millimicrons and containing a substantial quantity of an alkaline earth, its ferric oxide contents being less than .055 of one per cent.

53. A glass having permanent high ultra-violet transmission and containing less than 0.03 of one per cent of total iron, most of which iron is in the ferrous state.

54. A boro-silicate glass whose ferric oxide content is small and which, in thicknesses of 4 mm., is transparent to light waves shorter than 300 millimicrons.

55. A boro-silicate glass whose boric oxide content does not exceed 15%, containing less than 0.010 of one per cent of ferric oxide and which, in thicknesses of 2 mm., transmits over 50% of the radiation of 302 millimicrons length.

56. A boro-silicate glass whose boric oxide content does not exceed 15%, containing less than 0.020 of one per cent of ferric oxide and which, in thicknesses of 2 mm., transmits over 30% of the radiation of 302 millimicrons length.

57. A boro-silicate glass whose boric oxide content does not exceed 15%, containing less than 0.020 of one per cent of ferric oxide and less than 0.025 of one per cent of titanium, and which, in thicknesses of 2 mm., transmits over 30% of the radiation of 302 millimicrons length.

58. A boro-silicate glass whose boric oxide content does not exceed 15%, containing less than 0.023 of one per cent of ferric oxide and less than 0.015 of one per cent of titanium, and which, in thickness of 2 mm., transmits over 30% of the radiation of 302 millimicrons length.

59. A boro-silicate glass whose boric oxide content does not exceed 5%, containing less than 0.0025 of one per cent of ferric oxide and less than 0.008 of one per cent of titanium, and which, in thicknesses of 2 mm., transmits over 80% of the radiation of 302 millimicrons length.

60. A boro-silicate glass whose boric oxide content does not exceed 15%, containing less than 0.0018 of one per cent of ferric oxide and less than 0.008 of one per cent of titanium, and which, in thicknesses of 2 mm., transmits approximately 80% of the radiation of 302 millimicrons length.

61. A boro-silicate glass which in a thickness of 2 mm., is transparent to light waves as short as 250 millimicrons, and containing at least three elements in substantial proportions and being characterized by having a low content of iron and titanium which are in a reduced condition.

62. A zinc silicate glass having high ultra-violet transmission containing iron which figured as ferric oxide amounts to less than 0.04 of one percent, and melted under reducing conditions.

63. A silicate glass which in a thickness of 2 mm., is transparent to light waves as short as 250 millimicrons, and containing at least three elements in substantial proportions, one of which is an alkaline earth, and being characterized by having a low content of impurities of iron and titanium which are in a reduced condition.

HARRISON PORTER HOOD.